(12) United States Patent
Ulrich et al.

(10) Patent No.: US 10,088,003 B2
(45) Date of Patent: Oct. 2, 2018

(54) BRAKE PAD ARRANGEMENT WITH WEAR INDICATOR AND WEAR INDICATOR THEREFOR

(71) Applicant: Lucas Automotive GmbH, Koblenz (DE)

(72) Inventors: Berthold Ulrich, Hoenningen (DE); Stanley Baksi, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/910,122

(22) PCT Filed: Jul. 29, 2014

(86) PCT No.: PCT/EP2014/066267
§ 371 (c)(1),
(2) Date: Feb. 4, 2016

(87) PCT Pub. No.: WO2015/018693
PCT Pub. Date: Feb. 12, 2015

(65) Prior Publication Data
US 2016/0178023 A1  Jun. 23, 2016

(30) Foreign Application Priority Data
Aug. 8, 2013  (DE) .......................... 10 2013 013 290

(51) Int. Cl.
*F16D 66/02* (2006.01)
*F16D 65/09* (2006.01)
*F16D 65/092* (2006.01)

(52) U.S. Cl.
CPC ........... *F16D 66/02* (2013.01); *F16D 65/092* (2013.01); *F16D 66/028* (2013.01)

(58) Field of Classification Search
CPC ............................... F16D 66/02; F16D 66/026
See application file for complete search history.

(56) References Cited

U.S. PATENT DOCUMENTS 3,958,666 A * 5/1976 Hooten ................... F16D 66/02
                                                116/67 R
4,085,824 A   4/1978 Nomura
(Continued)

FOREIGN PATENT DOCUMENTS

DE    4110867 A1   10/1992
DE   69301021 T2    5/1996
(Continued)

OTHER PUBLICATIONS

German Search Report, Application No. 102013013290.8, dated Mar. 27, 2014.
(Continued)

*Primary Examiner* — Thomas J Williams
*Assistant Examiner* — James K Hsiao
(74) *Attorney, Agent, or Firm* — MacMillan, Sobanski & Todd, LLC

(57) ABSTRACT

Brake lining arrangement with wear indicator, comprising a planar lining carrier with a brake lining attached to a substantially plane holding surface, wherein the wear indicator has a supporting section, with which it is supported on the lining carrier, and an indicator section which extends beyond the holding surface in such a manner that it overlaps the material thickness of the brake lining and indicates a lining wear limit value, wherein the indicator section and supporting section are connected to each other via a transition section, wherein the transition section has a transition section axis. According to the invention, it is provided that the transition section axis is inclined at an acute angle to the holding surface.

15 Claims, 2 Drawing Sheets

(56) References Cited

U.S. PATENT DOCUMENTS

| | | | |
|---|---|---|---|
| 5,033,590 A | | 7/1991 | Kobayashi et al. |
| 5,299,663 A | | 4/1994 | Kobayashi et al. |
| 5,339,928 A | * | 8/1994 | Deit ........................ F16D 66/02 |
| | | | 188/1.11 W |
| 5,388,670 A | * | 2/1995 | Kuskye ................... F16D 66/02 |
| | | | 188/1.11 R |
| 5,520,265 A | | 5/1996 | Kobayashi et al. |
| 5,934,417 A | * | 8/1999 | Kobayashi ............. F16D 55/227 |
| | | | 188/1.11 W |
| 6,022,502 A | * | 2/2000 | Lockhart ............. B29C 37/0078 |
| | | | 264/113 |
| 6,691,835 B1 | * | 2/2004 | Zavodny ................. F16D 66/02 |
| | | | 188/1.11 W |
| 2008/0251326 A1 | * | 10/2008 | Lundskog ............. F16D 65/092 |
| | | | 188/1.11 W |
| 2014/0166410 A1 | * | 6/2014 | Boyle .................... B60T 17/22 |
| | | | 188/1.11 W |
| 2014/0291082 A1 | * | 10/2014 | Mallmann ........... F16D 65/0971 |
| | | | 188/250 E |

FOREIGN PATENT DOCUMENTS

| | | |
|---|---|---|
| DE | 102011087140 A1 | 6/2012 |
| EP | 0596761 A1 | 5/1994 |
| EP | 0763669 A1 | 3/1997 |
| JP | S6479435 A | 3/1989 |
| WO | 2013011490 A1 | 1/2013 |

OTHER PUBLICATIONS

PCT International Search Report, Application No. PCT/EP2014/066267, dated Oct. 15, 2014.

* cited by examiner

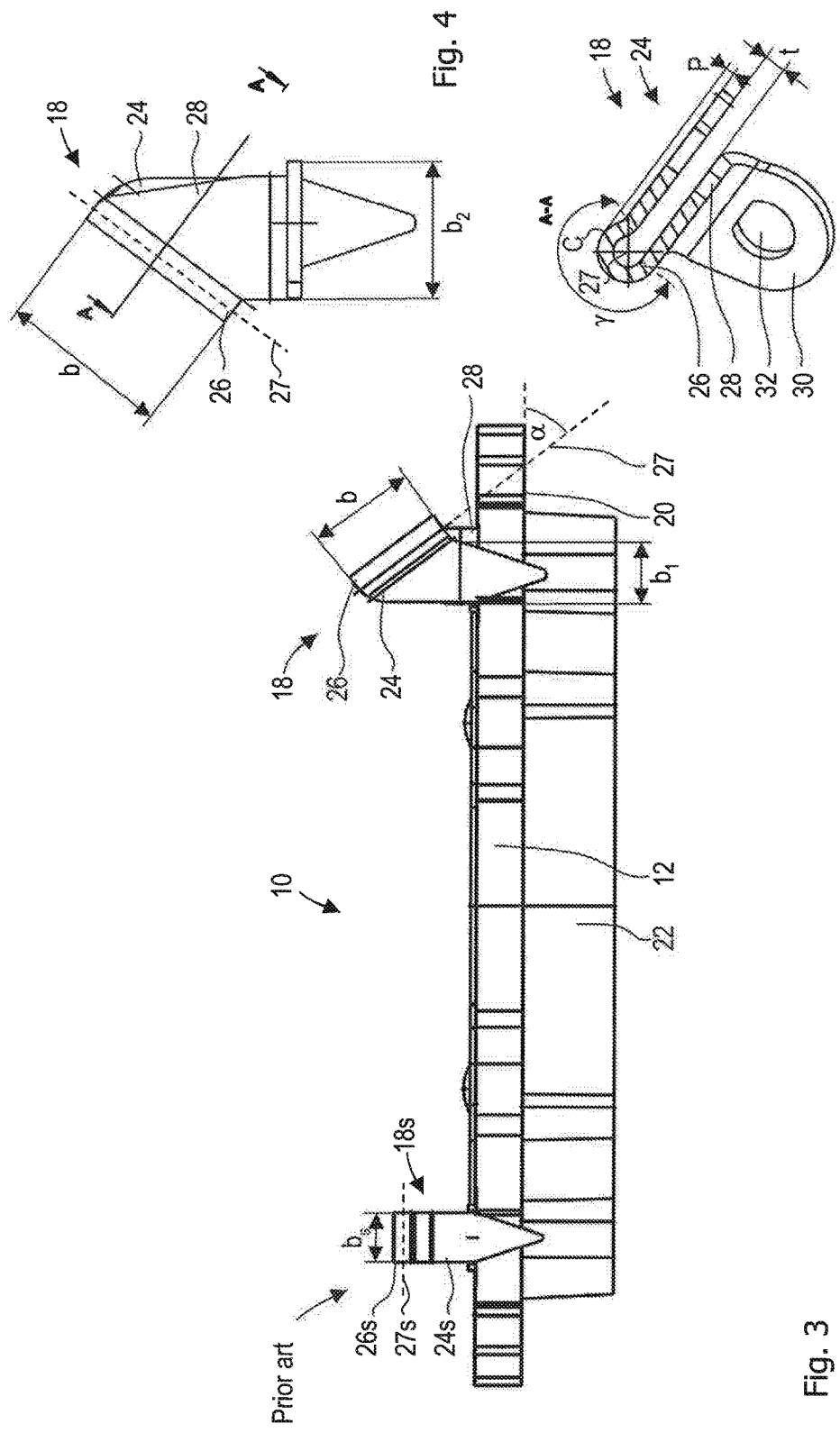

BRAKE PAD ARRANGEMENT WITH WEAR INDICATOR AND WEAR INDICATOR THEREFOR

CROSS-REFERENCE TO RELATED APPLICATIONS

This application is a national stage of International Application No. PCT/EP2014/066267 filed Jul. 29, 2014, the disclosures of which are incorporated herein by reference in entirety, and which claimed priority to German Patent Application No. 10 2013 013 290.8 filed Aug. 8, 2013, the disclosures of which are incorporated herein by reference in entirety.

BACKGROUND OF THE INVENTION

The present invention relates to a brake lining arrangement with wear indicator, comprising a planar lining carrier with a brake lining attached to a substantially plane holding surface, wherein the wear indicator has a supporting section, with which it is supported on the lining carrier, and an indicator section which extends beyond the holding surface in such a manner that it overlaps the material thickness of the brake lining and indicates a lining wear limit value, wherein the indicator section and supporting section are connected to each other via a transition section, wherein the transition section has a transition section axis.

Such brake lining arrangements are generally known from the prior art and are used in particular in brake systems of motor vehicles. To obtain a braking action in these arrangements, a frictional contact is made between an outwardly facing contact surface of the brake lining and a component of the vehicle to be braked, such as, for example, a brake disc rotating jointly with a wheel. The brake lining arrangement is moved, in a manner known per se, from a rest position free of frictional contact into a braking-active position under external force action and pressed with varying strength against the component to be braked.

The brake lining at first has an initial material thickness with which it extends transversely to the holding surface of the lining carrier. With increasing operating time of the brake lining arrangement, the material thickness decreases progressively as a result of wear phenomena during the frictional contact. After reaching a certain amount of wear, however, reliable functioning of the brake lining arrangement can no longer be ensured. In particular, the risk increases of the material thickness of the brake lining being reduced to such an extent that the lining carrier comes into direct contact with the component to be braked, whereby the respective components may be damaged.

It is therefore generally necessary to replace the brake lining arrangement or renew the brake lining on the lining carrier at the latest when a maximum lining wear limit value, i.e. a maximum permissible reduction of the material thickness of the brake lining, is reached. This presupposes that the reaching of the lining wear limit value or a proximity to this can be detected by a driver of the motor vehicle or a maintenance mechanic.

In order to obtain feedback on the state of wear of the brake lining, wear indicators of the kind described at the outset are used in the prior art. The documents WO 2013/011490 A1, U.S. Pat. No. 5,033,590, EP 0 596 761 A1, DE 295 14 892 U1, DE 10 2011 087 140 A1, DE 41 10 867 A1, U.S. Pat. No. 5,299,663 A, U.S. Pat. No. 4,085,824 A and JP S64-79 435 A disclose typical examples on this. In these, the wear indicators extend with a substantially plane indicator section beyond the holding surface of the respective lining carriers in such a manner they project into a cross-sectional plane of the brake lining or overlap the material thickness of the brake lining by the amount of the lining wear limit value. This means that the indicator section initially provides visual feedback on the state of wear of the brake lining, since the distance between the contact surface of the brake lining and the overlapping end of the indicator section can be detected by inspection. A maintenance mechanic can thus detect by checking this distance the likelihood of the lining wear limit value soon being reached and assess the need to replace the brake lining arrangement or renew the brake lining.

If, however, the lining wear limit value is reached or exceeded during the operation of the brake system, the indicator section comes into direct contact with the component to be braked. Due to the resulting frictional contact, noises are generated which are perceptible, for example, by a driver of a vehicle, so that the driver recognises the need to check the brake system. However, this presupposes that the wear indicator is designed to compensate for the high action of transverse forces during the frictional contact and maintain the frictional contact over a longer operating time and greater number of braking procedures. If, for example, the indicator section breaks off after only a few braking procedures or is plastically deformed in such a manner that it can no longer establish a frictional contact with the component to be braked, the merely temporarily achieved noise effect may possibly not be sufficient to draw the driver's attention sufficiently to the fact that the brake wear limit value has been reached.

It is therefore generally necessary to design the wear indicator in such a manner that the stresses generated therein during a frictional contact are kept low, so that the forces acting are compensated for purely elastically and a high fatigue strength is ensured. Such properties are combined below for simplification under the term "strength" of the wear indicator.

To achieve sufficient strength, customarily a one-piece metal strip is bent a plurality of times in order to produce the sequence of indicator section, transition section and supporting section mentioned at the outset. The indicator section is in this case of substantially plane form and extends at right angles to the holding surface from one side of the lining carrier, on which it overlaps the material thickness of the brake lining, to the side of the lining carrier facing away from the brake lining. There it is connected by a transition section to the likewise plane supporting section or merges into the latter. Starting from the transition section, the supporting section customarily runs firstly parallel to the indicator section and has additionally an angled-away fastening section, with which the wear indicator is fastened in a known manner to the holding carrier. The transition section thus connects the supporting and indicator sections which firstly extend parallel, and in doing so customarily spans an angle of approx. 180°. The transition section is bent around an axis called the transition section axis below, which extends substantially transversely through the transition section and runs, according to the prior art, parallel to the holding surface.

Such a solution is also known from the document U.S. Pat. No. 6,691,835 B 1. In this case, the wear indicator is formed as a one-piece metal bent part which is attached via a supporting section to a rear side of a brake lining carrier facing away from the brake lining. Furthermore, there is provided an indicator section in the form of a rectangular arm which extends to the front side of the brake lining carrier and overlaps the brake lining. For this purpose, the indicator section is angled with respect to the supporting section, the angled region constituting a transition section of the wear indicator. The transition section axis accordingly again runs parallel to the holding surface or in the plane of the brake lining carrier. Additionally, the indicator section in this solution is spirally twisted about it longitudinal axis.

When a frictional contact is produced between wear indicator and component to be braked, in particular the transition section is subjected to high loads. This section connects the indicator section, forming a free end of the wear indicator, and the supporting section supported on the lining carrier or directly fastened thereto. Under corresponding force action in the indicator section, the latter is deflected in a swinging manner relative to the supporting section, resulting in high bending stresses in the transition section. Accordingly, the transition section is a particularly critical region for the strength of the wear indicator. It has turned out, however, that the strength is insufficient in the solutions known from the prior art and safe functioning of the wear indicator in the sense of a sufficiently reliable and lasting noise generation is not ensured.

BRIEF SUMMARY OF THE INVENTION

It is therefore a feature of the present invention to provide a brake lining arrangement with a wear indicator, which arrangement has a greater reliability with respect to noise generation after reaching a lining wear limit value.

This feature is achieved by a brake lining arrangement of the kind described at the outset, in which it is provided that the transition section axis is inclined at an acute angle to the holding surface.

Regarding the prior art discussed above, the inventor has found that by arranging the transition section axis parallel to the holding surface sufficient strength improvement of the transition section, for example relative to the indicator section or supporting section, is not achieved, even though the transition section is subjected to markedly higher loads. Instead all the sections mentioned are formed with an equal width and therefore with equal cross-sectional areas in the prior art, which however unnecessarily limits the strength of the transition section.

In a departure from the brake lining arrangements known from the prior art, it is therefore provided according to the invention that the transition section axis no longer extends parallel to the holding surface of the lining carrier. Rather, the inventor has found that by angling the transition section axis at an acute angle to the holding surface, an increase in the cross-sectional area of the transition section can be achieved, so that the increased loads in this section can be compensated to a greater extent. In other words, the transition section according to the present invention is bent around an axis running obliquely to the holding surface and thus has a greater width than in the known solutions according to the prior art. Thus, without a marked increase in the size of the wear indicator or the material thickness and the weight, a marked improvement in the strength can be achieved, since the rigidity of the transition section is increased and thus the stresses occurring therein are reduced.

The wear indicator can in this case generally be formed in one piece with the lining carrier, be fastened to or integrally formed on further components attached to the lining carrier, or, as explained below, formed as a separate component.

A development of the invention provides that the transition section axis is inclined at an angle of 40 degrees to 70 degrees to the holding surface. The angling of the transition section axis relative to the holding surface by such angular amounts has proved particularly advantageous for increasing the strength of the wear indicator, since the maximum stresses occurring in the transition section are in this case markedly reduced.

To achieve a uniform stress profile, a development of the invention provides that the transition section is of rounded form. This ensures that the risk of local stress peaks occurring within the transition section is reduced. In this connection, it can further be provided according to the invention that the transition section is formed with a radius of 1 mm to 3.5 mm. Such radii have proved to be particularly advantageous for reducing stress peaks.

Furthermore, it can be provided according to the invention that the supporting section and the indicator section extend, at least in sections, parallel to each other. A particularly compact design of the wear indicator is thereby ensured.

In a development of the invention it is provided that the transition section is arranged on a side of the lining carrier facing away from the brake lining. This enables the amount by which the indicator section extends beyond the holding surface to be set particularly precisely and generally kept low. Furthermore, the further sections of the wear indicator can be relatively freely designed and also formed somewhat larger, since they are for the most part located on the side of the lining carrier opposite the brake lining and thus also remote from any component to be braked. Additionally or alternatively, it can be provided according to the invention that the supporting section is arranged completely on a side of the lining carrier facing away from the brake lining. This likewise increases the design freedom and the available space for forming at least this section.

Furthermore, it can be provided according to the invention that the transition section encloses an angle of greater than 180°. This is a particularly effective measure for increasing the strength of the transition section, since the rigidity of the transition section can thereby be markedly improved.

To increase the strength, it can further be provided according to the invention that the indicator section extends substantially in one plane and the transition section extends, at least in sections, beyond this plane. In other words, this development provides that the indicator section is set back or indented with respect to a radially outer point of the transition section. In this connection, it can further be provided according to the invention that the transition section extends by a distance of 0.25 mm to 1.5 mm beyond the plane of the indicator section. This range has been determined to be particularly advantageous for achieving a high strength.

A development of the invention provides that the wear indicator is formed as a component separate from the lining carrier. The separate forming of the wear indicators enables a simple production, in particular in the form of a one-piece metallic bent component. Such wear indicators are compact and easy-to-handle components which can also be attached or retrofitted, as required or variant-dependently, to braking lining arrangements.

In this connection, it can further be provided that the supporting section comprises a fastening section, with which the wear indicator is fastened to the lining carrier. By providing a separate fastening section it can be ensured that the forces transmitted when the indicator section comes into contact with the component to be braked can be introduced into the lining carrier in a defined manner.

In this connection, it can furthermore be provided that the fastening section comprises a receiving opening which receives a plastically deformed securing pin of the lining carrier, wherein the receiving opening is formed with a non-circular profile. The forming of such a receiving opening enables the wear indicator to be fastened to the lining carrier in a manner particularly secure against rotation. The fastening effect is generally achieved in that the receiving opening is firstly formed with an interference fit with respect to the plastically still undeformed fastening pin and is pushed onto the latter. Subsequently the securing pin is plastically deformed, whereby its diameter or cross-section is increased, so that it comes into contact with the receiving opening. A force lock or friction lock between wear indicator and lining carrier is thereby produced. By forming the receiving opening with a non-circular profile according to the invention, an additionally acting form lock is in this case produced, which counteracts a rotation of the wear indicator about the securing pin. In this connection, it can further be provided that the receiving opening is formed with a D-shaped profile. Such a profiling of the receiving opening is a particularly safe and reliable measure for producing a corresponding form lock.

The invention further relates to a separately formed wear indicator of the kind described above, wherein all of the above-mentioned features regarding the wear indicator can be provided individually or in any combination with one another.

Other advantages of this invention will become apparent to those skilled in the art from the following detailed description of the preferred embodiments, when read in light of the accompanying drawings.

BRIEF DESCRIPTION OF THE DRAWINGS

FIG. 3 shows a further view of the brake lining arrangement from FIG. 1;

FIG. 4 shows an illustration of the lining indicator from FIGS. 1 to 3 in a single-part illustration; and FIG. 5 shows a sectional illustration of the wear indicator from FIG. 4, the section axis running through the transition section of the wear indicator.

DETAILED DESCRIPTION OF THE INVENTION

Figure 1:
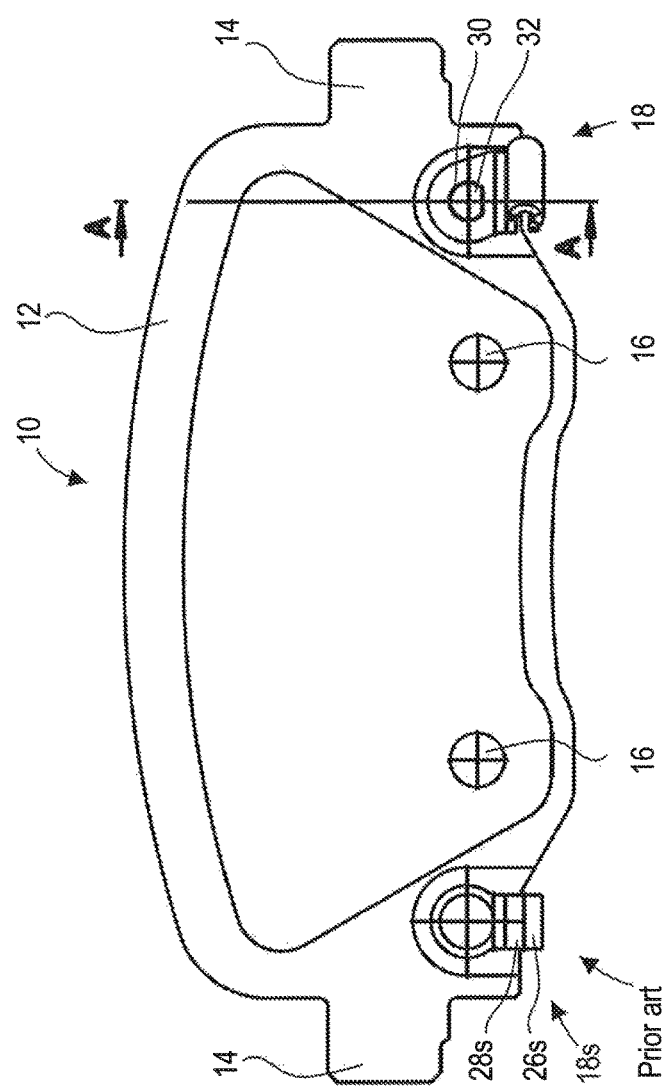
FIG. 1 illustrates a brake lining arrangement according to the invention, the view shown showing a side of the lining carrier facing away from the brake lining and the illustration further showing a wear indicator according to the prior art for comparison purposes.

In FIG. 1 a brake lining arrangement according to the invention is shown and designated generally by 10. The brake lining arrangement 10 comprises a planar lining carrier 12. The latter has, in a generally known manner, guide projections 14 for arranging the brake lining arrangement 10 in a brake system, and also fastening means 16, received in bores, for fixing a brake lining to the lining carrier. A brake lining 22 in the case shown is arranged on the side of the lining carrier 12 facing away from the plane of the paper.

At the left lower end in FIG. 1 a wear indicator according to the prior art is shown and at the right lower end a wear indicator 18 according to the present invention is shown. The wear indicator according to the prior art serves here merely for purposes of explanation. The respective wear indicators are formed as separate components and fastened to the lining carrier 12, as explained in more detail below.

Figure 2:
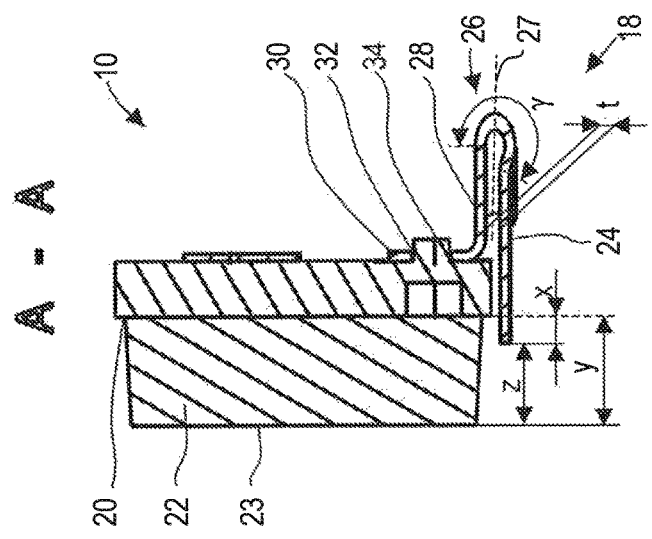
FIG. 2 shows a sectional view through the brake lining arrangement from FIG. 1, the section axis running through the wear indicator according to the invention.

In FIG. 2 the brake lining arrangement 10 is shown in a sectional illustration according to the section axis A-A from FIG. 1. It can be seen that the lining carrier 12 comprises, on its side not visible in FIG. 1, a plane holding surface 20, on which the brake lining 22 is arranged. The brake lining 22 has, on its outwardly facing side, a contact surface 23 which extends parallel to the plane of the holding surface 20. Furthermore, it can be seen that the wear indicator 18 is formed as a one-piece component and comprises a plurality of sections which merge into one another in a rounded or angled manner. To be more precise, the wear indicator 18 in the case shown is formed as a one-piece metallic stamped and bent component and has a substantially constant material thickness.

The wear indicator 18 comprises a plane indicator section 24 which extends beyond the holding surface 20 and overlaps the material thickness of the brake lining 22. The indicator section 24 is connected, via a transition section 26 of rounded form, to a likewise plane supporting section 28 extending at first parallel to the indicator section 24. In other words, the transition section 26 connects the planes running parallel directly adjoining it, of indicator section 24 and supporting section 26. It can be seen that in doing so the transition section 26 encloses an angle γ of more than 180°, and that the indicator section 24 and the supporting section 26 are spaced from each other by a distance t. Furthermore, the transition section 26 has a transition section axis 27, about which it is bent around and which extends transversely through the transition section 26.

The supporting section 28 further comprises a fastening section 30 which is angled at right angles away from the adjoining section of the supporting section 28 extending parallel to the indicator section 24. The fastening section 30 comprises a receiving opening 32 which receives a securing pin 34 of the lining carrier 10. The securing pin 34 is plastically deformed in such a manner that it completely fills the receiving opening 32, producing a friction lock. As can be seen from FIG. 1, the receiving opening 32 is formed with a D-shaped profile, so that a form lock exists between the securing pin 34 and the receiving opening 32. This form lock secures the wear indicator 18 additionally against rotation about the securing pin 34.

In FIGS. 1 and 2 the brake lining arrangement is shown in a wear-free initial state. In this state, the brake lining 22 has a predetermined material thickness y, with which it extends transversely to the plane of the holding surface 20. It can further be seen from FIG. 2 that the indicator section 24 projects by a predetermined extent x beyond the holding surface 20 and overlaps the material thickness y by the corresponding amount of the distance x. Thus, viewed relative to the indicator section 24, the brake lining 22 projects by a distance z from the holding surface 20, which is the difference of the distances y and x. The distance z thus defines the permissible reduction of the material thickness y of the brake lining 22 or that wear amount from which the indicator section 24 during a braking procedure comes into contact with a component to be braked (not shown). In other words, the distance x corresponds to a lining wear limit value from which the wear indicator interacts with the component to be braked and thereby generates warning noises, and the distance z corresponds to that amount of material thickness which can be removed until the lining wear limit value x is reached.

During the operation of the brake lining arrangement 10, the material thickness y is increasingly reduced by wear, so that the distance z likewise increasingly diminishes. By inspection of the brake lining arrangement 10, the distance z can be visually checked and thus an assessment continually made as to how close the wear is to reaching the lining wear limit value x. Thus, for example during maintenance work, early detection of a need to replace the brake lining arrangement 10 or the brake lining 22 on the brake carrier 12 is possible. But at the latest on reaching the lining wear limit value x, contact of the wear indicator 18 and the component to be braked, for instance the brake disc, occurs during braking and forces are introduced by the component to be braked into the wear indicator 18, whereby an acoustic warning signal is generated.

FIG. 3 shows a further view of the brake lining arrangement 10 from FIG. 1. The viewing axis here is directed in a direction from below in FIG. 1 at the brake lining arrangement 10. In other words, the brake lining arrangement 10 is tilted by 90° into the plane of the paper relative to the view from FIG. 1. At the left end in FIG. 3, in analogous fashion, the wear indicator according to the prior art is illustrated and at the right end the wear indicator 18 according to the present invention. It can be seen that the wear indicator 18 in turn has the indicator section 24 which projects from the holding surface 20 and which merges via the bent transition section 26 into the supporting section 28.

Furthermore, it can be seen from FIG. 3 that the transition section 26 or its transition section axis 27 is inclined by an acute angle a relative to the holding surface 20. This causes the width of the transition section b to exceed the width $b_1$ of the indicator section 24 discernibly.

In FIG. 4 the wear indicator 18 according to the figures discussed above is shown in a single-part illustration, the viewing axis being directed from above at the wear indicator 18, i.e. exactly opposite that from FIG. 3. It can be seen that, by the above-described inclined forming of the transition section axis 27, the width b of the transition section 26 also exceeds the width $b_2$ of the supporting section 30. Thus, the transition section 26 in the case shown is formed with a greater width and thus a greater cross-sectional area than the indicator section 24 and the supporting section 28.

As mentioned above, a wear indicator according to the prior art is also shown in FIGS. 1 and 3. To facilitate understanding, in the description of this wear indicator the same reference symbols as in the wear indicator 18 according to the invention are used and provided with the suffix "s". From FIGS. 1 to 3 it can be seen that the wear indicator 18s according to prior art likewise has the described sequence of indicator section 24s, transition section 26s and supporting section 28s including the fastening section 30s. In FIG. 3 it can be seen that the transition section 26s or its transition section axis 27s is, however, arranged parallel to the holding surface 20 and not inclined relative thereto. This has the consequence that, with the exception of the fastening section 30s, all sections of the wear indicator 18s are formed with an equal width $b_s$ and thus also an equal cross-sectional area. In each case, it can be seen by a comparison of the wear indicators 18s and 18 according to FIG. 3 that, by the inclined forming of the transition section axis 27 according to the invention, there is achieved a marked increase of the width b and thus of the cross-sectional area of the transition section 26 over that customary in the prior art.

When the lining wear limit value x is reached, the indicator section 24 comes into contact with the component to be braked. As a result, in particular transverse forces act on the indicator section 24, which forces act in the plane of the contact surface 23 of the brake lining 22 or in directions parallel to the plane of the holding surface 20. Likewise, normal forces act on the indicator section in a direction perpendicular to the planes of holding surface 20 and contact surface 23. During this, in particular the transition section 26 is heavily loaded, since the indicator section 24 is deflected in a swinging manner relative to the supporting section 28 fastened directly to the lining carrier 12 and the transition section 26 is subjected to corresponding bending loads. For example, the indicator section 24 is rotated, owing to the transverse forces acting, in the plane of the paper of FIG. 3, relative to the supporting section 28 with flexing of the transition section 26. The indicator section 24 is also deflected relative to the supporting section 28 in the directions perpendicular to the plane of the paper of FIG. 3. In this case, the transition section 26 is subjected to bending loads by an increase or decrease of the angle γ and thus of the distance t, described in connection with FIG. 2.

It is understood that mixed forms of the force actions and bending loads described may also occur or other regions of the wear indicator 18 are deformable. For example, introduced forces may influence that angular amount by which the fastening section 30 is angled away from the adjoining region of the supporting section 28. The fastening section per se is, however, deformed comparatively little, because it is in direct contact with the lining carrier 12. In contrast thereto, the transition section 26 is subjected to particularly extensive bending loads under the force introductions described and is thus a particularly critical region for the strength of the wear indicator 18, since it is subjected to correspondingly high stresses.

By forming the transition section 26 with an inclined transition section axis 27 according to the invention and thus increasing the width b of this section, what it is achieved is that the transition section 26 has a greater cross-sectional area compared with the solution according to the prior art. This increases the rigidity of the transition section 26, so that the stresses occurring under the described loads can be considerably reduced. Accordingly, the strength of the transition section 26 and thus the service life of the wear indicator 18 can be markedly increased.

In FIGS. 4 and 5 the wear indicator 18 according to the invention, as already described in connection with FIGS. 1 and 3, is shown in a single-part illustration. FIG. 5 shows a sectional view along the section axis A-A shown in FIG. 4. It can again be seen that the transition section 26 encloses an angle γ of more than 180° and that the supporting section 28 is spaced from the indicator section 24 by a distance t. Furthermore, it can be seen that the indicator section 24 is set back with respect to a radially outer point C of the transition section 26 by a distance P. In other words, the transition section 26 projects in its radially outer point C by the distance P from the plane of the indicator section 24. This too is an effective measure for increasing the rigidity of the transition section 26.

Furthermore, in FIG. 5 the above-described D-shaped profile of the receiving opening 32 is shown again separately.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A brake lining arrangement with wear indicator comprising:
   a planar lining carrier with a brake lining attached to a substantially plane holding surface, wherein the wear indicator has a supporting section, with which the wear indicator is supported on the lining carrier, and an indicator section which extends beyond the holding surface in such a manner that the indicator section overlaps a material thickness of the brake lining and indicates a lining wear limit value, wherein the indicator section and supporting section are connected to each other via a transition section, wherein the transition section has a transition section axis which extends longitudinally through a center of the transition section, wherein the transition section axis is inclined at an acute angle to the holding surface.

2. The brake lining arrangement according to claim 1, wherein the transition section axis is inclined at an angle of 40° to 70° to the holding surface.

3. The brake lining arrangement according to claim 1, wherein the transition section is of rounded form.

4. The brake lining arrangement according to claim 3, wherein the transition section is formed with a radius of 1 mm to 3.5 mm.

5. The brake lining arrangement according to claim 1, wherein the supporting section and the indicator section extend, at least in sections, in planes parallel to each other.

6. The brake lining arrangement according to claim 1, wherein the transition section is arranged on a side of the lining carrier facing away from the brake lining.

7. The brake lining arrangement according to claim 1, wherein the supporting section is arranged completely on a side of the lining carrier facing away from the brake lining.

8. The brake lining arrangement according to claim 1, wherein the transition section encloses an angle of greater than 180°.

9. The brake lining arrangement according to claim 1, wherein the indicator section extends substantially in one plane and the transition section extends, at least in sections, beyond the one plane of the indicator section.

10. The brake lining arrangement according to claim 9, wherein the transition section extends by a distance of 0.25 mm to 1.5 mm beyond the one plane of the indicator section.

11. The brake lining arrangement according to claim 1, wherein the wear indicator is formed as a component separate from the lining carrier.

12. The brake lining arrangement according to claim 1, wherein the supporting section comprises a fastening section, with which the wear indicator is fastened to the lining carrier.

13. The brake lining arrangement according to claim 12, wherein the fastening section comprises a receiving opening which receives a plastically deformed securing pin of the lining carrier, wherein the receiving opening is formed with a non-circular profile.

14. The brake lining arrangement according to claim 13, wherein the receiving opening is formed with a D-shaped profile.

15. A wear indicator for a brake lining arrangement according to claim 1.

* * * * *